United States Patent
Yoshino et al.

(10) Patent No.: US 10,470,119 B2
(45) Date of Patent: Nov. 5, 2019

(54) TERMINAL APPARATUS, COMMUNICATION CONTROL APPARATUS, COMMUNICATION SYSTEM, AND COMMUNICATION CONTROL METHOD

(71) Applicant: PANASONIC CORPORATION, Osaka (JP)

(72) Inventors: Masaaki Yoshino, Kanagawa (JP); Hiroaki Asano, Kanagawa (JP); Yasuharu Hashimoto, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 16/017,662

(22) Filed: Jun. 25, 2018

(65) Prior Publication Data
US 2018/0310243 A1    Oct. 25, 2018

Related U.S. Application Data

(63) Continuation of application No. PCT/JP2016/000620, filed on Feb. 5, 2016.

(30) Foreign Application Priority Data

Dec. 28, 2015  (JP) ................. 2015-256844

(51) Int. Cl.
*H04W 48/20* (2009.01)
*H04W 48/16* (2009.01)

(52) U.S. Cl.
CPC ........... *H04W 48/20* (2013.01); *H04W 48/16* (2013.01)

(58) Field of Classification Search
CPC ...... H04W 48/20; H04W 48/16; H04W 24/08
See application file for complete search history.

(56) References Cited

U.S. PATENT DOCUMENTS

| 9,949,187 B2 | 4/2018 | Miyagoshi et al. |
| 2008/0085712 A1* | 4/2008 | Han ...................... H04W 36/04 455/440 |

(Continued)

FOREIGN PATENT DOCUMENTS

| JP | 2008-118722 | 5/2008 |
| JP | 2015-109509 | 6/2015 |

(Continued)

OTHER PUBLICATIONS

International Search Report (ISR) from International Searching Authority (Japan Patent Office) in International Pat. Appl. No. PCT/JP2016/000620, dated Apr. 19, 2016.

*Primary Examiner* — Jinsong Hu
*Assistant Examiner* — Farideh Madani
(74) *Attorney, Agent, or Firm* — Greenblum & Bernstein, P.L.C.

(57) ABSTRACT

For selection of a wireless access point, a terminal apparatus is configured to include a transmitter transmitting terminal information to a communication control apparatus, a receiver receiving access point candidate information from the communication control apparatus, a bandwidth estimator estimating current bandwidth associated with each of the candidate wireless access points included in the access point candidate information, and an access point selector selecting at least one wireless access point for communication from the candidate wireless access points included in the access point candidate information. Terminal information includes information on a communication location where the terminal apparatus communicates with the communication control apparatus and the access point candidate information includes information on candidate wireless access points for the communication location and past bandwidth information acquired associated with each of the candidate wireless (Continued)

access points. The wireless access point is selected based on past bandwidth information and estimated current bandwidth.

9 Claims, 17 Drawing Sheets

(56) References Cited

U.S. PATENT DOCUMENTS

| | | | | |
|---|---|---|---|---|
| 2011/0222523 | A1* | 9/2011 | Fu | H04W 36/22 |
| | | | | 370/338 |
| 2014/0105016 | A1* | 4/2014 | Tsuda | H04W 4/00 |
| | | | | 370/230.1 |
| 2015/0065126 | A1* | 3/2015 | Jung | H04W 48/16 |
| | | | | 455/434 |
| 2015/0139031 | A1* | 5/2015 | Kang | H04W 16/10 |
| | | | | 370/254 |
| 2016/0212034 | A1* | 7/2016 | Shomura | H04L 43/0888 |
| 2017/0105134 | A1* | 4/2017 | Lee | H04W 24/08 |

FOREIGN PATENT DOCUMENTS

| | | | |
|---|---|---|---|
| JP | 2015109509 A | * | 6/2015 |
| JP | 2015-186074 | | 10/2015 |

* cited by examiner

*Fig.3*

| ESSID | BSSID | Communication fees [¥/Kbyte] | Management company | Encryption method |
|-------|-------|------------------------------|--------------------|--------------------|
| XXX | AAA | 10 | NN | AES |
| XXX | BBB | 0 | DD | None (No Encryption) |
| YYY | CCC | 0 | PP | None (No Encryption) |
| ZZZ | DDD | 0 | KK | None (No Encryption) |
| ... | ... | ... | ... | ... |
| ... | ... | ... | ... | ... |

*Fig.4*

BSSID: AAA

| Day | Time | RSSI[dBm] | RTT[ms] | Bandwidth [Mbps] |
|---|---|---|---|---|
| Mon. | 10:15 | −62 | 11 | 92 |
| Mon. | 10:18 | −60 | 9 | 99 |
| Mon. | 10:21 | −70 | 15 | 30 |
|  | 10:24 | −80 | 22 | 5 |
| ... | ... | ... | ... | ... |
| ... | ... | ... | ... | ... |

Fig.5

Time 10:15

| No. | ESSID | BSSID | Bandwidth [Mbps] | Ccommunication fees [¥/Kbyte] | Management company | Encryption method |
|---|---|---|---|---|---|---|
| 1 | XXX | AAA | 92 | 10 | NN | AES |
| 2 | XXX | BBB | 10 | 0 | DD | None (No Encryption) |
| 3 | YYY | CCC | 30 | 0 | PP | None (No Encryption) |
| 4 | ZZZ | DDD | 1 | 0 | KK | None (No Encryption) |

Fig.7

| Application | Required bandwidth [Mbps] | Delay time [ms] |
|---|---|---|
| Motion picture | 20 | 5 |
| AR/VR | 50 | 1 |
| Web browser | 1 | 10 |
| Game | 15 | 3 |
| ... | ... | ... |
| ... | ... | ... |

*Fig.8*

Time 10:15

| Priority order | ESSID | BSSID | Bandwidth [Mbps] |
|---|---|---|---|
| 1 | XXX | AAA | 92 |
| 2 | YYY | CCC | 30 |

*Fig.11*

| No. | ESSID | RSSI[dBm] |
|---|---|---|
| 1 | XXX | −62 |
| 2 | YYY | −60 |

Fig.16

| Cooperation control parameter | Cooperation control level |
|---|---|
| Channel | 2 |
| Bendwidth | 2 |
| RTS threshold | 2 |
| Transmission power | 1 |
| ABF | 3 |

TERMINAL APPARATUS, COMMUNICATION CONTROL APPARATUS, COMMUNICATION SYSTEM, AND COMMUNICATION CONTROL METHOD

CROSS-REFERENCE TO RELATED APPLICATION

This application is a continuation of International Application No. PCT/JP2016/000620 filed Feb. 5, 2016, which claims priority to Japan Application No. JP 2015-256844 filed Dec. 28, 2015, the disclosures of which are expressly incorporated by reference herein in their entireties.

TECHNICAL FIELD

The present disclosure relates to a terminal apparatus which performs communication via a wireless access point, a communication control apparatus which controls a connection from a terminal apparatus to a wireless access point, a communication system including a terminal apparatus and a communication control apparatus, and a communication control method for determining a wireless access point to be used for communication from a terminal apparatus.

BACKGROUND ART

In recent years, the number of wireless access points (hereinafter also referred to as simply as "access point(s)") has been rapidly increasing due to the widespread use of various wireless communication systems such as mobile phone communication networks (e.g. LTE (Long Term Evolution)) and wireless LANs. Terminal apparatuses such as smartphones can select a desired access point from multiple nearby access points as appropriate for wireless communications.

However, when a terminal apparatus randomly selects a wireless access point to be used for communication, establishing a connection sometimes becomes difficult due to traffic congestion at the selected access point, or even after establishing a connection to the selected access point, a desired transmission speed sometimes cannot be achieved in the wireless communication network depending on wireless communication quality or available bandwidth.

Examples of known techniques for properly selecting a base station such as an access point of wireless LAN or a mobile phone base station include a wireless communication system in which a terminal apparatus measures communication quality between the terminal apparatus and each base station, and transmits communication quality information along with measurement location information to a management server, and in which the management server creates a communication quality database indicating communication qualities associated with respective base stations for each location in the area based on the received communication quality information and measurement location information, edits map information for the terminal apparatus or the base station, determines the reliability of the map information, and transmits the map information and the determined reliability to the terminal apparatus so that, when performing data communication, the terminal apparatus can select the base station for communications by weighting the communication quality information and the map information considering the received reliability. (See Patent Document 1)

PRIOR ART DOCUMENT(S)

Patent Document(s)

Patent Document 1: JP2015-109509A

SUMMARY OF THE INVENTION

Task to be Accomplished by the Invention

In the prior art technology disclosed in Patent Document 1, the management server combines communication quality information, which indicates conditions of wireless communication, with information on a server load (an amount of accesses to the server) to thereby construct a database used for creating map information.

However, in the above-described prior art technology, since information collected by the management server changes with time, the map information, which is acquired by the terminal apparatus from the management server in order to select a base station, does not always match a current bandwidth state (i.e. the communication speed) associated with a base station. As a result, the terminal apparatus, in some cases, becomes unable to select a proper base station.

The present disclosure has been made in view of such problems of the prior art, and a primary object of the present disclosure is to provide a terminal apparatus, a communication control apparatus, a communication system, and a communication control method, each of which enables proper selection of a wireless access point to be used for communication by taking into consideration accumulated past bandwidth information associated with each of the candidate wireless access points and a current bandwidth state of the access point.

Means to Accomplish the Task

According to the present disclosure, a terminal apparatus configured to select a wireless access point to be used for communication from a plurality of connectable wireless access points by communicating with a communication control apparatus for communication control, comprising:

a transmitter for transmitting terminal information to the communication control apparatus wherein the terminal information includes information on a communication location where the terminal apparatus communicates with the communication control apparatus;

a receiver for receiving access point candidate information from the communication control apparatus wherein the access point candidate information includes information on candidate wireless access points for the communication location; and a processor, wherein the processor estimates a current bandwidth associated with each of the candidate wireless access points included in the access point candidate information, and selects at least one wireless access point to be used for communication from the candidate wireless access points included in the access point candidate information, wherein the access point candidate information includes past bandwidth information acquired associated with each of the candidate wireless access points, and wherein the processor selects the at least one wireless access point based on the past bandwidth information and the estimated current bandwidth.

Effect of the Invention

The present disclosure enables a terminal apparatus to properly select a wireless access point to be used for communication by taking into consideration accumulated past bandwidth information associated with each of the candidate wireless access points and a current bandwidth state of the access point.

BRIEF DESCRIPTION OF THE DRAWINGS

FIG. 3 is an illustration diagram showing an example of access point management data list of the first embodiment;

FIG. 4 is an illustration diagram showing an example of communication record list associated with an access point of the first embodiment;

FIG. 5 is an illustration diagram showing an example of candidate wireless access point list for applications in the terminal apparatus of the system of the first embodiment;

FIG. 7 is an illustration diagram showing an example of required bandwidth list for applications in the terminal apparatus of the system of the first embodiment;

FIG. 8 is an illustration diagram showing an example of modified candidate wireless access point list for applications in the terminal apparatus of the system of the first embodiment;

FIG. 11 is an illustration diagram showing an example of detected nearby access point list of the second embodiment;

FIG. 16 is an illustration diagram showing an example of estimated cooperation control level list of the fourth embodiment.

DESCRIPTION OF THE PREFERRED EMBODIMENT(S)

Figure 1:
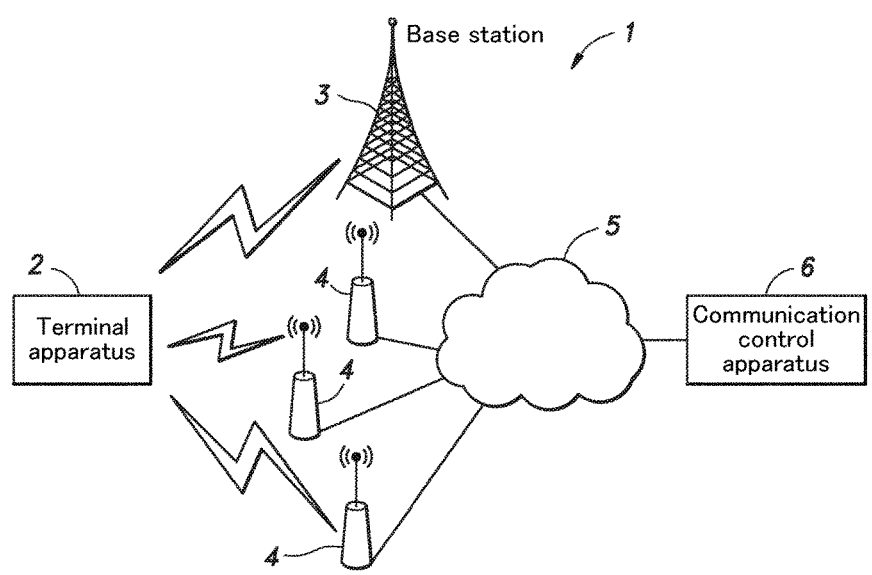
FIG. 1 is a general configuration diagram of a communication system according to a first embodiment of the present disclosure.

A first aspect of the present disclosure made to accomplish the above-described task is a terminal apparatus configured to select a wireless access point to be used for communication from a plurality of connectable wireless access points by communicating with a communication control apparatus for communication control, comprising:

a transmitter for transmitting terminal information to the communication control apparatus wherein the terminal information includes information on a communication location where the terminal apparatus communicates with the communication control apparatus;

a receiver for receiving access point candidate information from the communication control apparatus wherein the access point candidate information includes information on candidate wireless access points for the communication location; and a processor, wherein the processor estimates a current bandwidth associated with each of the candidate wireless access points included in the access point candidate information, and selects at least one wireless access point to be used for communication from the candidate wireless access points included in the access point candidate information, wherein the access point candidate information includes past bandwidth information acquired associated with each of the candidate wireless access points, and wherein the processor selects the at least one wireless access point based on the past bandwidth information and the estimated current bandwidth.

The terminal apparatus of the first aspect enables proper selection of a wireless access point to be used for communication by taking into consideration past bandwidth information associated with each of the candidate wireless access points accumulated in the communication control apparatus (i.e. including past bandwidth information regarding wireless communication with other terminal apparatuses) and a current bandwidth state of the access point.

A second aspect of the present disclosure is the terminal apparatus of the first aspect, wherein the processor estimates the current bandwidth based on an RTT (round-trip delay time).

The terminal apparatus of the second aspect enables more reliable estimation of a current bandwidth based on an RTT.

A third aspect of the present disclosure is the terminal apparatus of the first aspect, wherein the processor detects one or more connectable nearby wireless access points at the communication location, wherein the terminal information includes information regarding the connectable nearby wireless access points, and wherein the candidate wireless access points include the connectable nearby wireless access points.

The terminal apparatus of the third aspect enables more proper selection of a wireless access point to be used for communication because the terminal apparatus can take into consideration actually existing nearby access points (in particular, new access points not yet recognized by the communication control apparatus) when extracting candidate wireless access points.

A forth aspect of the present disclosure is the terminal apparatus of the first aspect, wherein the processor detects whether or not each connectable nearby wireless access point executes cooperation control, wherein the terminal information includes a detection result for cooperation control, and wherein the access point candidate information includes information on one or more candidate wireless access points that correspond to the detection result for cooperation control.

The terminal apparatus of the fourth aspect enables proper selection of a wireless access point to be used for communication which has a greater bandwidth estimation result and which is executing cooperation control and is thus more reliable (i.e. having a greater reliability of bandwidth estimation result) because the terminal apparatus can take into consideration whether or not each actually existing nearby wireless access point executes cooperation control when extracting candidate wireless access points.

A fifth aspect of the present disclosure is the terminal apparatus of the first aspect, wherein the processor detects a channel to be used associated with each connectable nearby wireless access point, wherein the terminal information includes a detection result for channel to be used, and wherein the access point candidate information includes information on one or more candidate wireless access points that correspond to the detection result for channel to be used.

The terminal apparatus of the fifth aspect enables proper selection of a wireless access point to be used for communication which has a greater bandwidth estimation result and uses a channel which is used by no other access points (or less other access points) and thus more reliable (i.e. having a greater reliability of bandwidth estimation result) because the terminal apparatus can take into consideration a channel of each actually existing nearby wireless access point when extracting candidate wireless access points.

A sixth aspect of the present disclosure is the terminal apparatus of the first aspect, wherein the processor detects a wireless noise level associated with each connectable nearby wireless access point, wherein the terminal information includes a detection result for wireless noise level, and wherein the access point candidate information includes information on one or more wireless access points that correspond to the detection result for wireless noise level.

The terminal apparatus of the sixth aspect enables proper selection of a wireless access point to be used for communication which has a greater bandwidth estimation result and also has a lower noise level (i.e. having a greater reliability of bandwidth estimation result) because the terminal apparatus can take into consideration a noise level of each actually existing nearby wireless access point when extracting candidate wireless access points.

A seventh aspect of the present disclosure is the terminal apparatus of the third aspect, wherein the processor detects wireless signal intensities associated with the connectable wireless access points.

The terminal apparatus of the seventh aspect enables the recognition of wireless communication quality of each nearby access point based on wireless signal intensities (RSSI) of connectable nearby wireless access points at the communication location.

An eighth aspect of the present disclosure is the terminal apparatus of the first aspect, wherein the transmitter transmits information on one or more detected nearby wireless access points and information on the estimated current bandwidth to the communication control apparatus.

The terminal apparatus of the eighth aspect advantageously facilitates the accumulation of information on each of the detected nearby wireless access points and bandwidth information.

A ninth aspect of the present disclosure is a terminal apparatus configured to select a wireless access point to be used for communication from a plurality of connectable wireless access points by communicating with a communication control apparatus for communication control, comprising:

a transmitter for transmitting terminal information to the communication control apparatus wherein the terminal information includes information on a communication location where the terminal apparatus communicates with the communication control apparatus;

a receiver for receiving access point candidate information from the communication control apparatus wherein the access point candidate information includes information on candidate wireless access points for the communication location; and a processor, wherein the processor measures a communication quality associated with each wireless access point included in the access point candidate information, and selects at least one wireless access point to be used for communication from the candidate wireless access points included in the access point candidate information, wherein the transmitter further transmits information on the measured communication quality to the communication control apparatus, wherein the receiver receives information on bandwidth associated with each of the wireless access points from the communication control apparatus, the bandwidth being estimated based on the information on the communication quality, and wherein the processor selects the at least one wireless access point based on the estimated bandwidth.

The terminal apparatus of the ninth aspect enables proper selection of a wireless access point to be used for communication by taking into consideration past bandwidth information associated with each of the candidate wireless access points accumulated in the communication control apparatus and a current bandwidth state of the access point.

A tenth aspect of the present disclosure is a communication control apparatus configured to transmit the access point candidate information to the terminal apparatus of the first aspect.

The communication control apparatus of the tenth aspect allows the terminal apparatus to properly select a wireless access point to be used for communication by taking into consideration accumulated past bandwidth information associated with each of the candidate wireless access points and a current bandwidth state of the access point.

An eleventh aspect of the present disclosure is a communication system comprising:

the terminal apparatus of the first aspect, and the communication control apparatus of the tenth aspect.

The communication system of the eleventh aspect allows the terminal apparatus to properly select a wireless access point to be used for communication by taking into consideration past bandwidth information associated with each of the candidate wireless access points accumulated in the communication control apparatus and a current bandwidth state of the access point.

A twelfth aspect of the present disclosure is a communication control method for a terminal apparatus which performs communication via a wireless access point selected based on information from a communication control apparatus, comprising:

transmitting terminal information to the communication control apparatus wherein the terminal information includes information on a communication location where the terminal apparatus communicates with the communication control apparatus;

receiving access point candidate information from the communication control apparatus wherein the access point candidate information includes information on candidate wireless access points for the communication location; and estimating a current bandwidth associated with each of the candidate wireless access points included in the access point candidate information, wherein the access point candidate information includes past bandwidth information acquired associated with each of the candidate wireless access points; and wherein at least one wireless access point to be used for communication is selected from the candidate wireless access points included in the access point candidate information based on the past bandwidth information and the estimated current bandwidth associated with each of the candidate wireless access points.

The communication control method of the twelfth aspect allows the terminal apparatus to properly select a wireless access point to be used for communication by taking into consideration past bandwidth information associated with each of the candidate wireless access points accumulated in the communication control apparatus and a current bandwidth state of the access point.

A thirteenth aspect of the present disclosure is a communication control method for a terminal apparatus which performs communication via a wireless access point selected based on control information from a communication control apparatus, comprising:

transmitting terminal information to the communication control apparatus wherein the terminal information includes information on a communication location where the terminal apparatus communicates with the communication control apparatus;

receiving access point candidate information from the communication control apparatus wherein the access point candidate information includes information on candidate wireless access points for the communication location;

measuring a communication quality for each wireless access point included in the access point candidate information;

transmitting information on the measured communication quality to the communication control apparatus; and receiving information on bandwidth associated with each of the wireless access points from the communication control apparatus, wherein the bandwidth is estimated based on the information on the communication quality, wherein at least one wireless access point to be used for communication is selected from the candidate wireless access points included in the access point candidate information based on the estimated bandwidth.

The communication control method of the thirteenth aspect allows the terminal apparatus to properly select a wireless access point to be used for communication by taking into consideration past bandwidth information associated with each of the candidate wireless access points accumulated in the communication control apparatus and a current bandwidth state of the access point.

Embodiments of the present disclosure are described in the following with reference to the appended drawings.

First Embodiment

FIG. 1 is a general configuration diagram of a communication system 1 according to a first embodiment of the present disclosure. The communication system 1 primarily includes a terminal apparatus 2, a base station 3 and access points 4 which both relay wireless communication, and a communication control apparatus 6 which is connectable to the terminal apparatus 2 via a communication network 5 such as a telephone network or the Internet. The terminal apparatus 2 is connectable to the communication network 5 via a base station 3 and an access point 4.

As described in detail later, when performing wireless communication via an access point 4 in the communication system 1, the terminal apparatus 2 executes a process of selecting an appropriate wireless access point to be used for communication from multiple access points 4 (hereinafter referred to as "wireless access point selection process") depending on a communication location where the terminal apparatus performs wireless communication (normally, the current location of the terminal apparatus), a communication state (communication quality, available bandwidth or the like associated with each access point) and other factors (if any).

The terminal apparatus 2 has a known wireless communication function for performing wireless communication via the base station 3 and the access point 4. Although, in this case, a smartphone (or multifunctional mobile phone) is used as a non-limiting example of the terminal apparatus 2, other portable information communication devices such as a tablet PC, a PDA, and a notebook PC may be used as the terminal apparatus. Although FIG. 1 shows only one terminal apparatus 2 for convenience of illustration, the communication system 1 can include multiple terminal apparatuses in practice.

The base station 3 is a device located at an end of the mobile communication network and capable of relaying wireless communication from the terminal apparatus 2 using one or more known mobile communication standards (such as 3G for mobile communication and LTE), and the access point 4 is a device capable of relaying the wireless communication from the terminal apparatus 2 using one or more well-known wireless LAN standards (such as IEEE802.11a, 11b, 11g, 11n, 11ac, 11ad). The access points 4 may include not only equipment managed by a management company which provides a paid or free wireless communication service, but also any device (such as a router having a wireless access point function) that can be disposed in general stores, houses, or other location. The number and arrangement of the base station 3 and the access points 4 are not limited to those shown in FIG. 1, and can be changed as appropriate.

The communication control apparatus 6 is a device for controlling communication from the terminal apparatus 2, and in particular, the communication control apparatus can provide the terminal apparatus 2 with information (or a command) required for the terminal apparatus to select an access point to be used for communication from the multiple access points 4. Although, in this case, a server apparatus is used as a non-limiting example of the communication control apparatus 6, any other computer apparatus having the same function as the server apparatus can be use as the communication control apparatus 6. In some cases, the communication control apparatus 6 may perform wireless communication with the terminal apparatus 2, not via a telephone network, the Internet, or other network.

Figure 2:
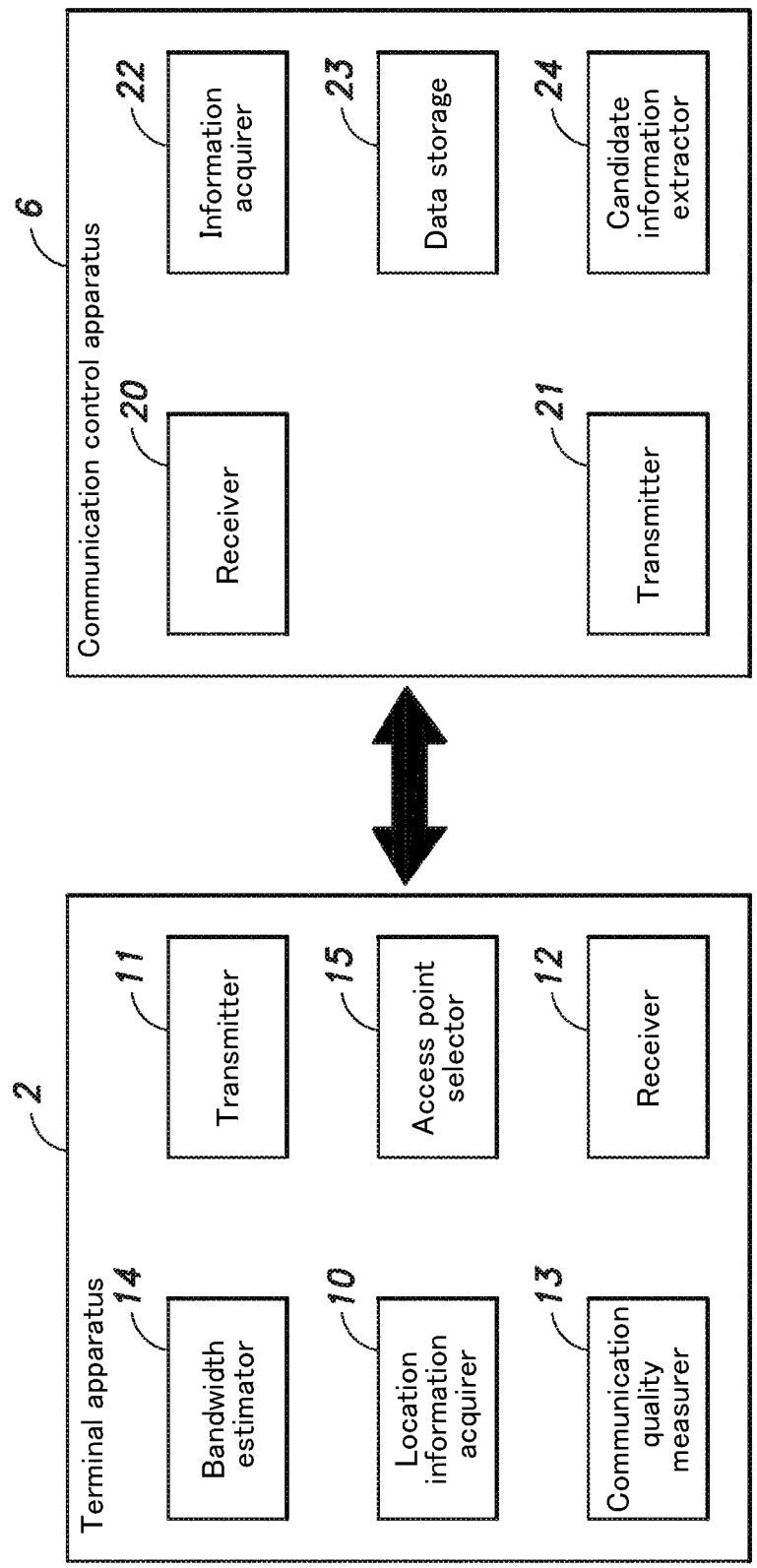
FIG. 2 is a functional block diagram of a terminal apparatus and a communication control apparatus of the communication system of the first embodiment.

FIG. 2 is a functional block diagram of the terminal apparatus 2 and the communication control apparatus 6 of the communication system 1. FIG. 3 is an illustration diagram showing an example of access point management data list. FIG. 4 is an illustration diagram showing an example of communication record list associated with the access point, and FIG. 5 is an illustration diagram showing an example of candidate wireless access point list for applications in the terminal apparatus.

The terminal apparatus 2 has functions of respective sections 10 to 15 shown in FIG. 2. A location information acquirer 10 acquires information on wireless communication location (the current location, in this case) where the terminal apparatus 2 performs wireless communication by using a GPS (Global Positioning System) function of the terminal apparatus 2. The method for acquiring information on communication location which can be adopted by the location information acquirer 10 is not limited to such a GPS based positioning method, but may be, for example, a method of acquiring information on wireless communication location based on communication with base station 3, or a method of grasping a location by receiving a signal periodically transmitted from a transmitter (Bluetooth (Registered Trademark) beacon).

A transmitter 11 can transmit various types of information relating to the wireless access point selection process to the communication control apparatus 6, and the transmitter transmits, for example, terminal information including information on wireless communication location and other types of information to the communication control apparatus 6. A receiver 12 can receive various types of information and instructions relating to the wireless access point selection process from the communication control apparatus 6, and the receive receives, for example, information on candidate wireless access points including information on access points available at the communication location from the communication control apparatus 6.

A communication quality measurer 13 measures a wireless communication quality associated with each access point included in the received information on candidate wireless access points. The wireless communication quality is measured based on at least one of RSSI (Received Signal Strength Indicator), Signal-to-Noise Ratio (SNR), and a packet error rate of wireless waves s from each access point 4, for example. The communication quality measurer 13 can measure a packet error rate by, for example, sending a measurement packet to an access point 4 via the transmitter 11 and counting the response from the access point 4 received by the receiver 12.

A bandwidth estimator 14 estimates a bandwidth (available bandwidth) associated with each access point included in the information on candidate wireless access points. The bandwidth estimator 14 measures an RTT (round-trip delay time) by transmitting a measurement packet of Ping or like from the terminal apparatus 2 to the access point to be measured, and can estimate a bandwidth based on the measured RTT.

An access point selector 15 selects a wireless access point to be used for communication from the access point candidates included in the information on candidate wireless access points. In most cases, the access point selector 15 selects one wireless access point to be used for communication, but the access point selector may select multiple access points for connection. The access point selector 15 can select a wireless access point to be used for communication based on a wireless access point selection policy preset by a user of the terminal apparatus 2. The terminal apparatus 2 can perform communication with any communication partners (e.g. web servers, other terminal apparatuses) via the access point selected as a wireless access point to be used for communication.

In this case, the access point selector 15 uses a bandwidth prioritizing policy, which is a non-limiting example of wireless access point selection policy, in which the access point selector preferentially selects an access point with a larger bandwidth. Alternatively, the access point selector may use, for example, a delay time prioritizing policy in which the selector preferentially selects an access point with a smaller delay time, a power consumption prioritizing policy in which the selector preferentially selects an access point with lower power consumption, a communication amount prioritizing policy in which the selector preferentially selects an access point with more communication record, a communication-fee prioritizing policy in which the selector preferentially selects an access point with lower communication fees, a security prioritizing policy in which the selector preferentially selects an access point with higher security (more highly secure encryption method), or a data performance prioritizing policy in which access points are weighted based on the bandwidth included in information on candidate wireless access points from the communication control apparatus 6 (or the terminal apparatus 2 does not measure the current bandwidth). When a desired access point cannot be selected based on such a wireless access point selection policy, the access point selector 15 does not select a wireless access point to be used for communication.

Although not shown, the terminal apparatus 2 may have the same hardware configuration as known smartphones or other devices. For example, the terminal apparatus 2 includes a processor for comprehensively executing various types of information processing and control of peripheral devices based on a preset control program, a RAM (Random Access Memory) functioning as a work area for the processor or other elements, a ROM (Read Only Memory) for storing control programs executable by the processor and data, a GPS module, a touch panel functioning as a display device for displaying various types of information to a user and an input device operated by the user, and an auxiliary storage device for storing various pieces of information and data. The terminal apparatus 2 further includes an antenna and a communication module for wireless communication. The antenna and the communication module can be used for wireless communication utilizing any of known mobile communication standards (3G, LTE, and other standards for mobile communication) or known wireless LAN standards (IEEE802.11a, 11b, 11g, 11n, 11ac, 11ad, etc) or for communication via Bluetooth (Registered Trademark). The functions of the sections 10 to 15 of the terminal apparatus 2 as described above are implemented by hardware therefor and control programs executable by the processor.

The communication control apparatus 6 has functions of sections 20 to 24 shown in FIG. 2. The receiver 20 can receive requests relating to the wireless access point selection process from the terminal apparatus 2 and various types of information such as information including terminal information transmitted from the terminal apparatus 2. The transmitter 21 can transmit various types of information and instructions relating to the wireless access point selection process to the terminal apparatus 2. For example, the transmitter transmits to the terminal apparatus information on candidate wireless access points, which information includes information on access points available at the communication location included in terminal information.

An information acquirer 22 acquires various types of information, which are required for the wireless access point selection process, from the terminal apparatus 2 and also from multiple other terminal apparatuses (not shown), the base station 3, and each access point 4 via the receiver 20, and then stores those various types of information in a data storage 23. The information stored in the data storage 23 includes, for example, access point management information as well as communication record data associated with each access point.

The access point management information is configured, for example, as an access point management data list as shown in FIG. 3, which list includes pieces of information such as an ESSID (Extended Service Set IDentifier), a BSSID (Basic Service Set IDentifier), communication fees, an access point management company code, and an encryption method for each access point. The ESSID or BSSID is associated with information on the location of each access point.

The communication record data associated with each access point is configured, for example, as a communication record list of each access point at a prescribed day of week and/or date and time as shown in FIG. 4. The communication record list in FIG. 4 includes accumulated RSSI, RTT, and bandwidth data at a prescribed day of week and/or date and time associated with an access point having the BSSID "AAA." Data stored in the data storage 23 are not limited to those shown in FIG. 4, and may include communication record data associated with access points having different BSSIDs in a proper manner.

The prescribed day of week and/or date in the communication record data is not limited to be selected from seven days of week, Monday to Sunday. In some embodiments, weekend holidays (Saturday and Sunday) may be treated as data of one group, for example. The time intervals (three-minute intervals in FIG. 4) at which data are accumulated can be appropriately changed within a range where the accuracy of the wireless access point selection process is not reduced, and the amount of data to be accumulated can be reduced, for example, by setting longer intervals such as 5 minute intervals, 30 minute intervals, or 1 hour intervals. When communication via an access point is paid and the communication fees vary according to the length of time, the communication record data may include data of communication fees.

An RTT in the communication record data can be an average of RTTs acquired from multiple terminal apparatuses. For example, in the case of accumulating data at three minute intervals, an RTT at time 10:15 (Average RTT (10:15) when there are reports from three UEs during a three-minute time period from 10:15) can be calculated from the following equation.

$$\text{Average RTT}(10:15) = (\text{UE1\_RTT}(10:16) + \text{UE2\_RTT}(10:16) + \text{UE3\_RTT}(10:17))/3$$

where

UE1_RTT (10:16): RTT measured by the terminal apparatus UE1 at 10:16,

UE2_RTT (10:16): RTT measured by the terminal apparatus UE2 at 10:16, and

UE3_RTT (10:17): RTT measured by the terminal apparatus UE3 at 10:17.

Moreover, an RTT at 10:15, for example, can also be calculated from the following equation, taking past RTTs into consideration.

$$\text{Average RTT}(10:15) = \alpha \times \text{Average RTT}(10:15) + (1-\alpha) \times \text{DB-RTT}(10:15)$$

where $\alpha$: Weighting Coefficient for an instantaneous value from the terminal apparatus 2, $1-\alpha$: Weighting Coefficient of bandwidth data from the communication control apparatus 6 (information on candidate wireless access points), DB_RTT (10:15): RTT at 10:15 by last week from the communication control apparatus 6, and Average RTT (10:15): Average RTT for today's three-minute time period from 10:15 to 10:17.

An RTT of the communication record data is not limited to an average of RTTs acquired from multiple terminal apparatuses, and may be a maximum RTT, a minimum RTT, or other representation of RTTs.

A candidate information extractor 24 extracts candidate access points for the communication location included in the terminal information from the terminal apparatus 2 and generates information on candidate wireless access points associated with the extracted access points. In this process of extracting candidate access points, the candidate information extractor 24 can extract access points which are connectable or available to the terminal apparatus 2 at the communication location at the time of performing communication (in this case, the current time of the current day) by referring to access point management information and communication record data associated with multiple access points stored in the data storage 23. The information on candidate wireless access points are configured, for example, as a candidate wireless access point list associated with respective access points as shown in FIG. 5, which list includes an ESSID, a BSSID, a bandwidth, communication fees, an access point management company code, and an encryption method for each access point.

Although not shown, the communication control apparatus 6 may have the same hardware configuration as known server apparatuses. In an example of hardware configuration, the communication control apparatus 6 includes a processor for comprehensively executing various types of information processing and control of peripheral devices based on a preset control program, a RAM functioning as a work area for the processor or other elements, a ROM for storing data and control programs executable by the processor, a network interface for performing a communication process via a network, a monitor, an input device, an auxiliary storage device or the like. The functions of the sections 20 to 24 of the communication control apparatus 6 as described above are implemented by hardware and control programs executable by the processor.

Figure 6:
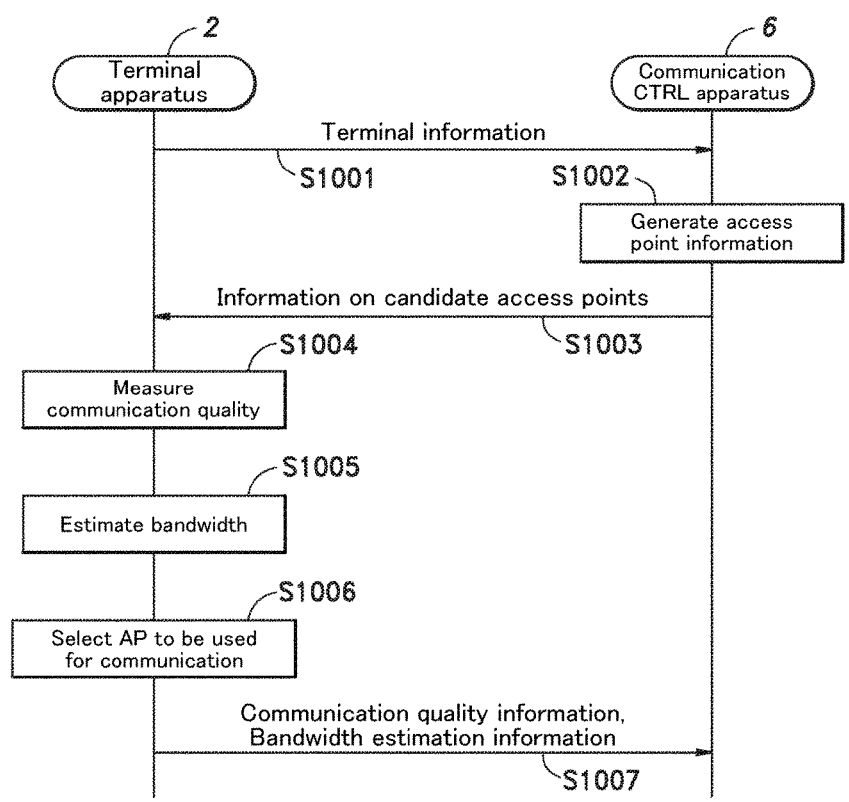
FIG. 6 is a control sequence diagram regarding a process of selecting a wireless access point to be used for communication in the terminal apparatus of the system of the first embodiment.

FIG. 6 is a control sequence diagram regarding the wireless access point selection process in the communication system 1. FIG. 7 is an illustration diagram showing an example of required bandwidth list for applications in the terminal apparatus and FIG. 8 is an illustration diagram showing an example of modified candidate wireless access point list for applications.

When starting communication via an access point 4, the terminal apparatus 2 can be connected to the communication control apparatus 6 via the base station 3 (and thus to the mobile communication network) first so that the terminal apparatus 2 can transmit terminal information to the communication control apparatus 6 (S1001).

After acquiring the terminal information from the terminal apparatus 2, the communication control apparatus 6 extracts access points which are connectable or available to the terminal apparatus 2 at the communication location of at the time of performing communication (in this case, the current position and the current time), thereby generating information on candidate wireless access points (candidate wireless access point list) associated with the extracted access points (S1002). Thereafter, the communication control apparatus 6 transmits the information on candidate wireless access points to the terminal apparatus 2 (S1003).

Then, the terminal apparatus 2 measures a wireless communication quality associated with each access point included in the received information on candidate wireless access points (S1004). Subsequently, the terminal apparatus 2 estimates a bandwidth associated with each access point included in the information on candidate wireless access points (S1005).

Next, the terminal apparatus 2 utilizes information on access points included in the information on candidate wireless access points (recorded past bandwidths or the like), measurement results of wireless communication qualities, and estimation results of bandwidths to select, based on a connection selection policy, one or more wireless access points for connection from the candidate access points included in the information on candidate wireless access points (S1006). In S1006, when only one wireless standard (for example, only IEEE802.11ac) is available, the terminal apparatus 2 finally selects one standard. In addition, when two or more wireless standards (for example, IEEE802.11ac, IEEE802.11ad, etc.) are available, the terminal apparatus can select multiple standards.

Thereafter, the terminal apparatus 2 transmits to the communication control apparatus 6 communication quality information which includes the measurement results of wireless communication qualities and bandwidth estimation information which includes the bandwidth estimation results (S1007). Upon receiving the communication quality information and the bandwidth estimation information, the communication control apparatus 6 updates (or newly adds), based on these pieces of information, the access point management information and the communication record data associated with each access point.

In S1001, the terminal apparatus 2 can transmit to the communication control apparatus 6 information on required bandwidths of applications running when the terminal apparatus performs wireless communication (that is, applications that requires transmission and reception of data through wireless communication) included in the terminal information.

The information on required bandwidths is configured, for example, as a required bandwidth list as shown in FIG. 7, which list includes required bandwidths and desired delay times prescribed for respective applications such as motion picture applications, AR (Augmented Reality)/VR (Virtual Reality) applications, and Web browser applications, and game applications. For example, when a motion picture application is running, the terminal apparatus 2 can transmit to the communication control apparatus 6 a required bandwidth of 20 Mbps and a desired delay time of 5 ms as part of the terminal information.

As a result, in S1002 as described above, the communication control apparatus 6 creates information on candidate wireless access points (that is, extracts access points with a bandwidth of 20 Mbps or greater), for example, by taking the required bandwidth of 20 Mbps into consideration. The information on candidate wireless access points is configured, for example, as a candidate wireless access point list, which includes access points ranked in priority order of their bandwidths as shown in FIG. 8.

In the bandwidth estimation performed in S1005, a bandwidth (estimated value) Rate can be calculated not only by the above-described method, but also by using the following equation, for example.

$$Rate = C\_RTT \times \alpha \times F\_RTT(NowRTT) + (1-\alpha) \times DB\_Rate$$

where $\alpha$: Weighting Coefficient for an instantaneous value from the terminal apparatus 2, $1-\alpha$: Weighting Coefficient of bandwidth data from the communication control apparatus 6 (information on candidate wireless access points), C_RTT: Coefficient, F_RTT: Function for calculating a bandwidth from RTT, NowRTT: Instantaneous RTT measured by the terminal apparatus 2, and DB_Rate: Bandwidth data acquired from the communication control apparatus 6 (information on candidate wireless access points).

In the bandwidth estimation performed in S1005, after extracting some access points in advance (for example, by excluding access points with a bandwidth not greater than a prescribed threshold), the terminal apparatus 2 can transmit packets for bandwidth estimation to each of the selected access points to obtain an RTT, and an estimate bandwidth by using the following equation.

$$\text{Bandwidth(estimated value)} = \text{packet size for bandwidth estimation[byte]} \times 2 \times 8/RTT[s].$$

In this case, an initial bandwidth estimation packet size (window size) can be determined based on an RTT provided from the communication control apparatus 6. This makes it possible to determine a window size in a short time period.

Second Embodiment

Figure 9:
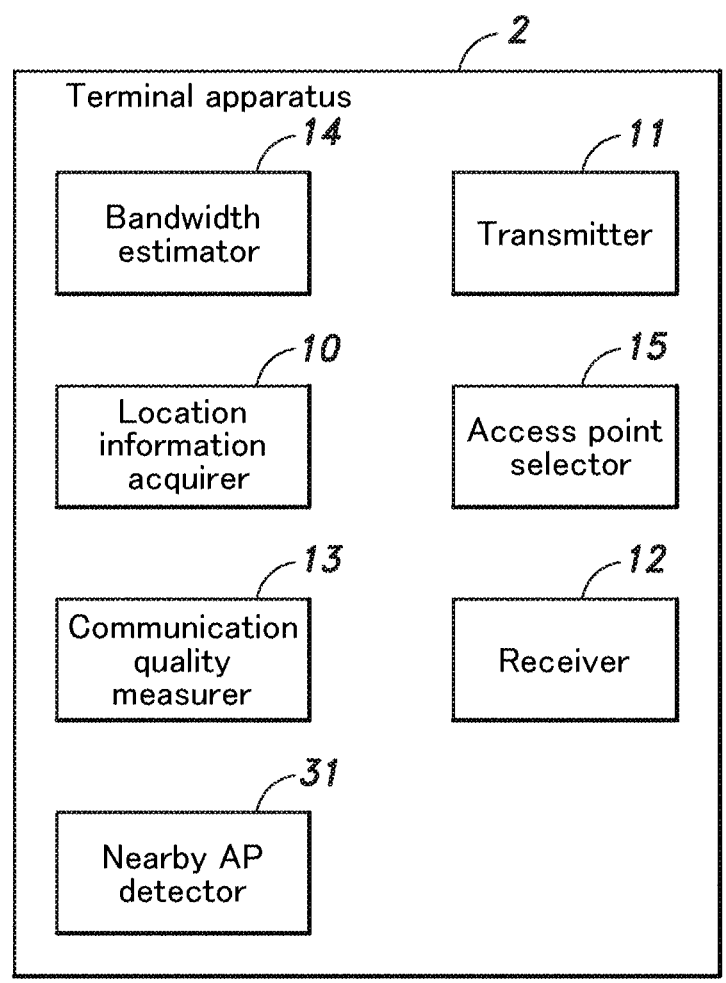
FIG. 9 is a functional block diagram of a terminal apparatus in a communication system according to a second embodiment of the present disclosure.
Figure 10:
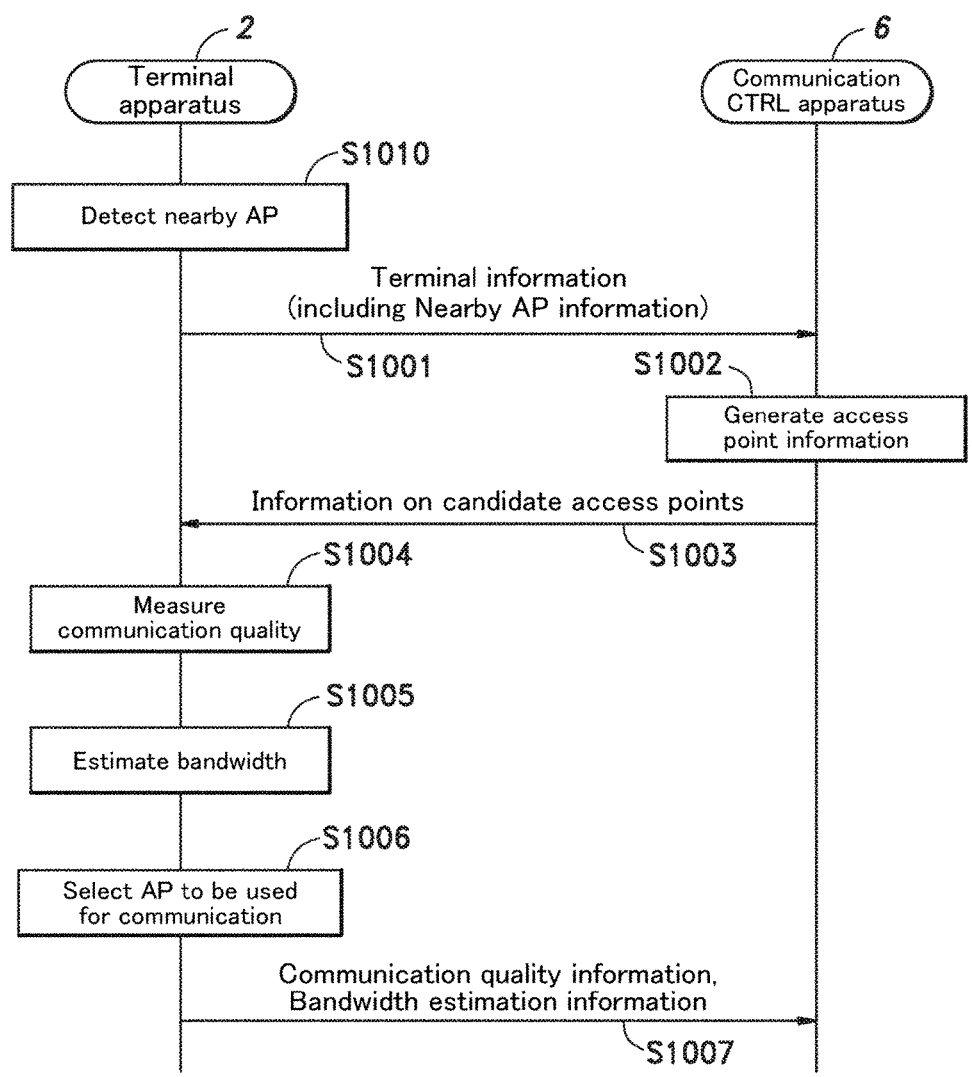
FIG. 10 is a control sequence diagram in the communication system of the second embodiment.
Figure 11:
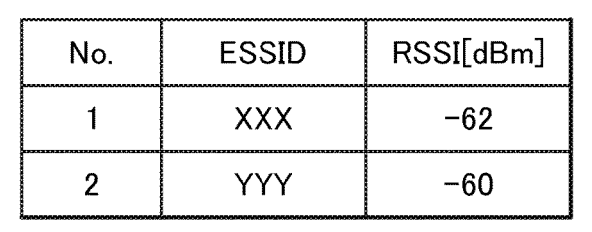

FIG. 9 is a functional block diagram of a terminal apparatus 2 in a communication system according to a second embodiment of the present disclosure. FIG. 10 is a control sequence diagram in the communication system, and FIG. 11 is an illustration diagram showing an example of detected nearby access point list. In FIGS. 9 and 10, the same reference numerals are given to the same components as those shown in FIGS. 2 and 6 (First Embodiment). Regarding the communication system according to the second embodiment, matters not particularly mentioned below are the same as those in the first embodiment.

As shown in FIG. 9, the terminal apparatus 2 according to the second embodiment is different from that of the first embodiment in that the terminal apparatus 2 further includes a nearby AP (access point) detector 31 for detecting one or more nearby access points connectable or available to the terminal apparatus 2 at a communication location where the terminal apparatus 2 performs communication.

As shown in FIG. 10, before transmitting terminal information to the communication control apparatus 6, the terminal apparatus 2 detects connectable nearby access points, thereby generating nearby AP information which includes information regarding the detected access points (S1010). The nearby AP information is configured, for example, as a detected nearby access point list as shown in FIG. 11, which list includes information such as ESSID and RSSI of each detected access point.

The terminal apparatus 2 transmits the terminal information, which includes the nearby AP information as well as information on the communication location, to the communication control apparatus 6 (S1001). In this embodiment, when generating information on candidate wireless access points (S1002), the communication control apparatus 6 can use the nearby AP information received from the terminal apparatus 2 such that the communication control apparatus 6 can take into consideration access points actually existing near the terminal apparatus 2 (in particular, new access points not yet recognized by the communication control apparatus) as candidate access points for connection. As a result, the information on candidate wireless access points, which information is transmitted from the communication control apparatus 6 to the terminal apparatus 2 in S1003, can include information on the detected nearby access points located near the terminal apparatus 2 (in particular, new access points not yet recognized by the communication control apparatus 6).

Third Embodiment

Figure 12:
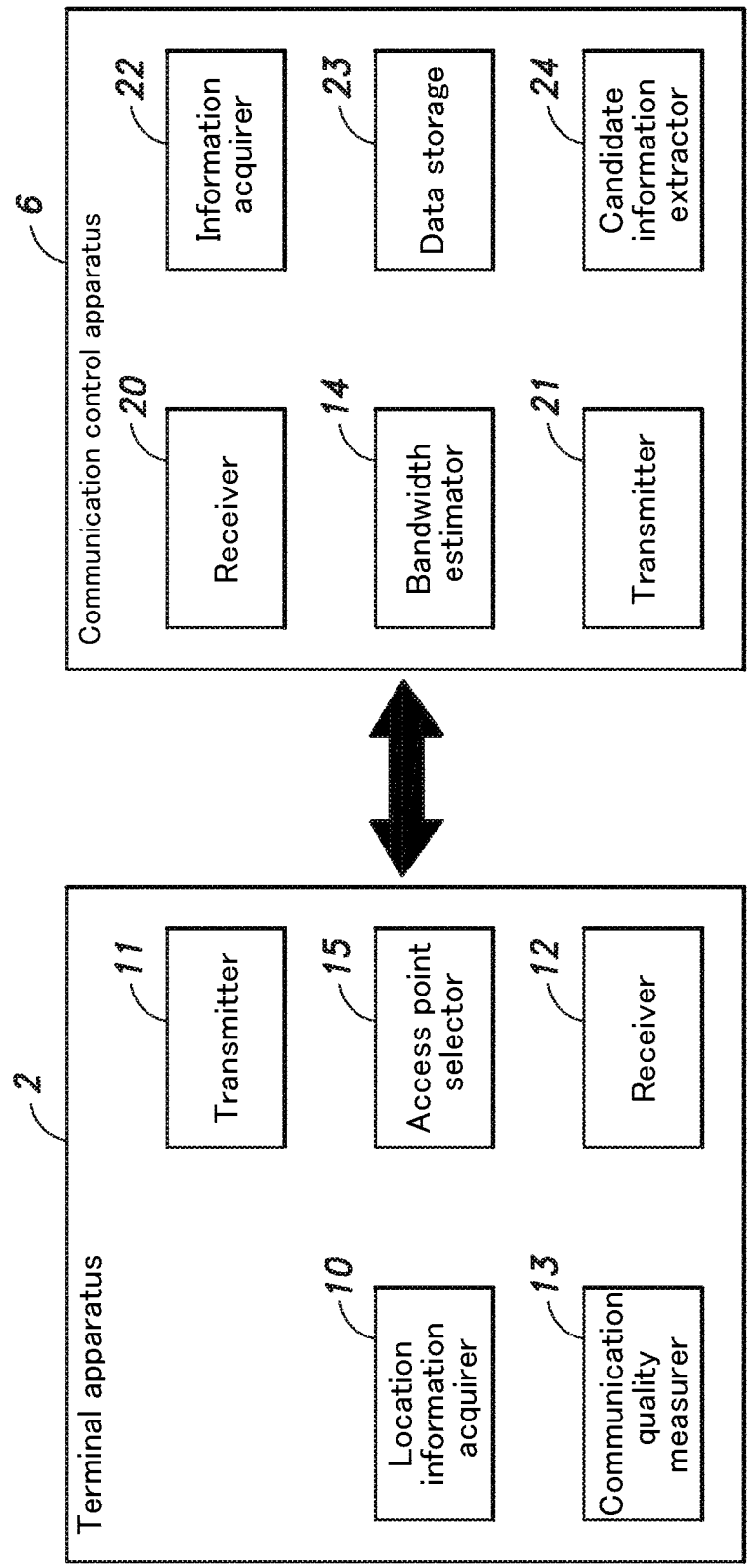
FIG. 12 is a functional block diagram of a terminal apparatus and a communication control apparatus of a communication system according to a third embodiment of the present disclosure.
Figure 13:
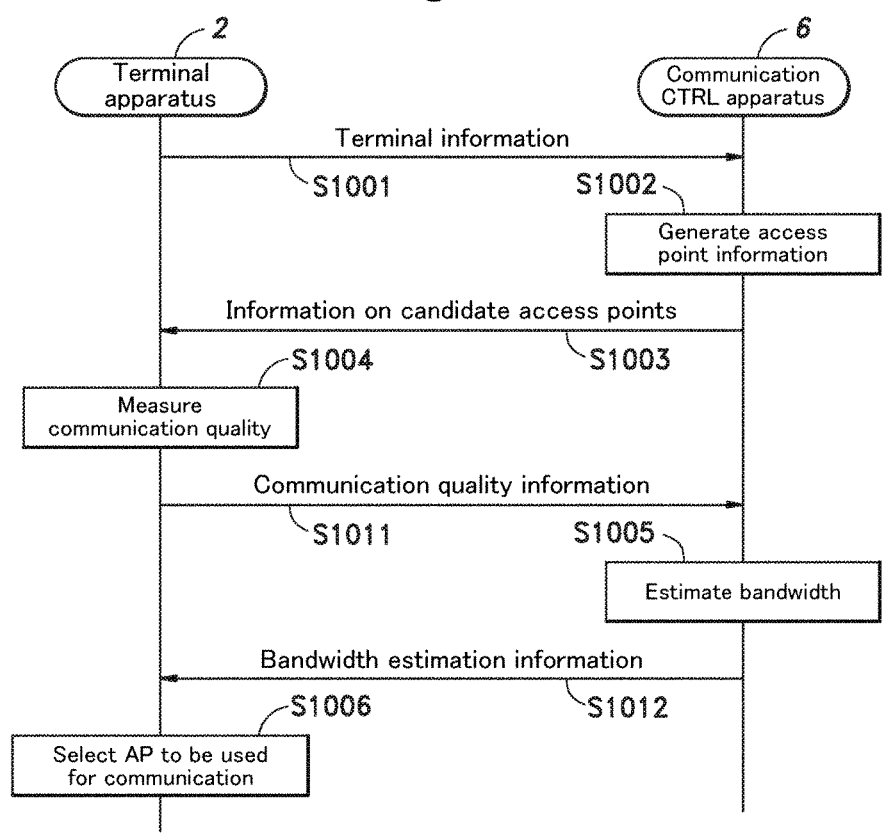
FIG. 13 is a control sequence diagram in the communication system of the third embodiment.

FIG. 12 is a functional block diagram of a terminal apparatus and a communication control apparatus in a communication system according to a third embodiment of the present disclosure, and FIG. 13 is a control sequence diagram in the communication system. In FIGS. 12 and 13, the same reference numerals are given to the same components as those shown in FIGS. 2 and 6 (the first embodiment). Regarding the communication system according to the third embodiment, matters not particularly mentioned below are the same as those in the first embodiment.

As shown in FIG. 12, the communication system according to the third embodiment is different from the system of the first embodiment in that a terminal apparatus 2 does not include the bandwidth estimator 14 and that a communication control apparatus 6 includes a bandwidth estimator 14.

As shown in FIG. 13, upon measuring the wireless communication quality of each access point included in the received information on candidate wireless access points (S1004), the terminal apparatus 2 transmits the communication quality information, which includes measurement results of the wireless communication qualities, to the communication control apparatus 6 (S1011). The communication control apparatus 6 estimates a bandwidth associated with each access point based on an RTT included in the received communication quality information (S1005).

Next, the communication control apparatus 6 transmits bandwidth estimation information, which includes estimation results of bandwidths, to the terminal apparatus 2 (S1012). The terminal apparatus 2 utilizes information on candidate access points included in the information on candidate wireless access points (recorded past bandwidths or the like), as well as the measurement results of wireless communication qualities and the estimation results of bandwidths to select, based on a connection selection policy, one or more wireless access points for connection from the candidate access points included in the information on candidate wireless access points (S1006).

It should be noted that the communication control apparatus 6 can correct the bandwidths, which have been estimated based on the communication quality information in step S1005 as described above, by using the communication record data associate with the access points stored in the data storage 23. In addition, the measurement results of the wireless communication qualities, which have been transmitted to the communication control apparatus 6 in S1011 as described above, may be an RSSI. In this case, the communication control apparatus 6 can estimate a bandwidth based on the RSSI in S1005.

Fourth Embodiment

Figure 14:
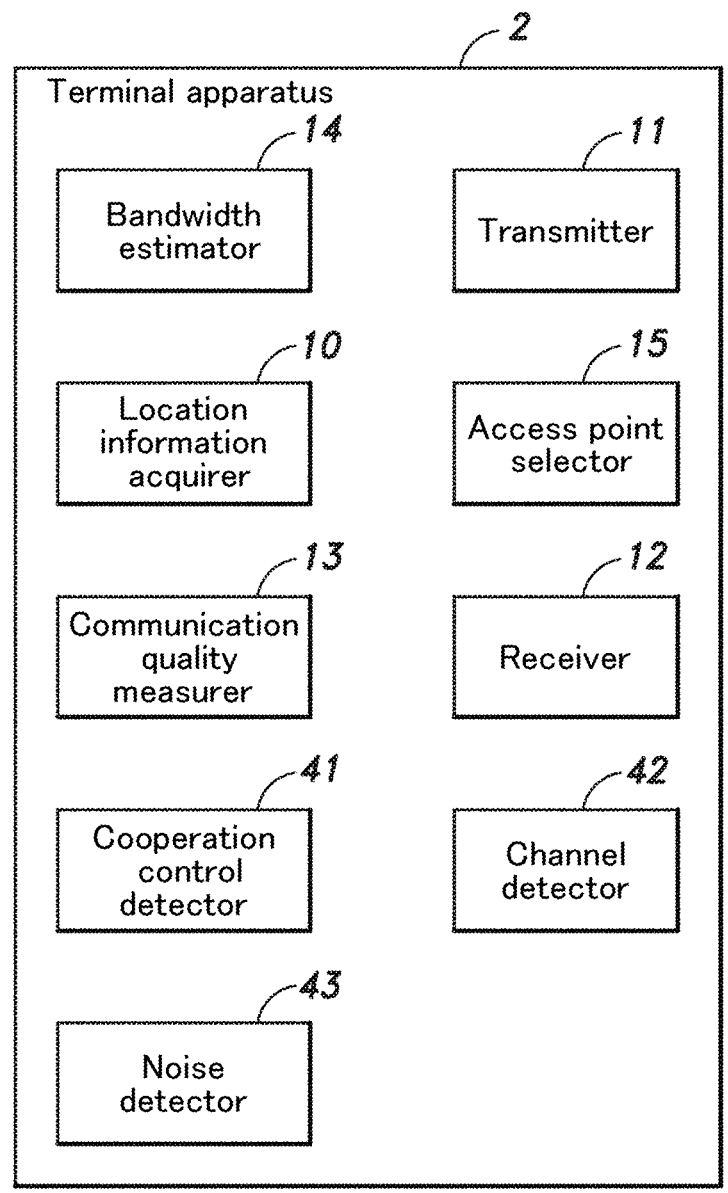
FIG. 14 is a functional block diagram of a terminal apparatus of a communication system according to a fourth embodiment of the present disclosure.
Figure 15:
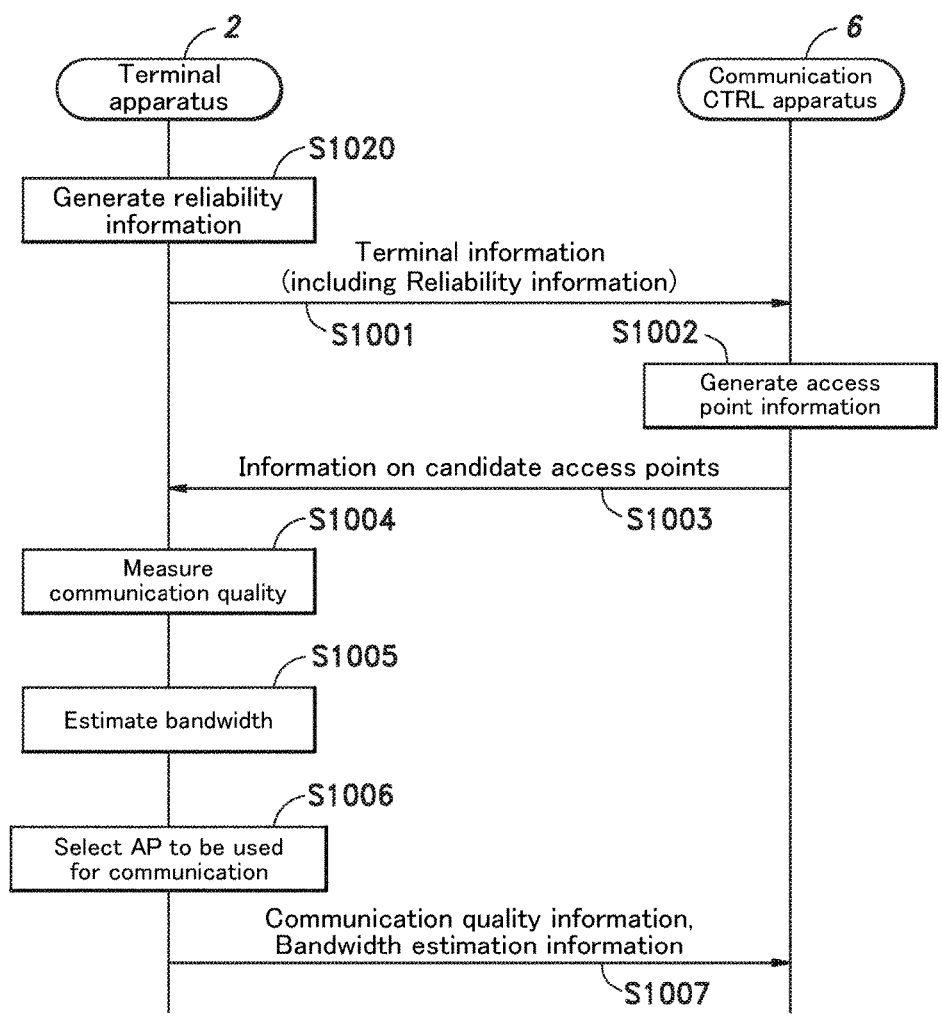
FIG. 15 is a control sequence diagram in the communication system of the fourth embodiment.

FIG. 14 is a functional block diagram of a terminal apparatus 2 in a communication system according to a fourth embodiment of the present disclosure. FIG. 15 is a control sequence diagram in the communication system, and FIG. 16 is an illustration diagram showing an example of estimated cooperation control level list. In FIGS. 14 and 15, the same reference numerals are given to the same components as those shown in FIGS. 2 and 6 (First Embodiment). Regarding the communication system according to the fourth embodiment, matters not particularly mentioned below are the same as those in the first embodiment.

The term "cooperation control" means that an access point controls a channel to be used, a bandwidth, a transmission power, a carrier sensing threshold, subordinate terminals or the like in an adaptive manner depending on the status of one or more nearby access points or terminals.

As shown in FIG. 14, the terminal apparatus 2 according to the fourth embodiment is different from the system of the first embodiment in that the terminal apparatus further includes a cooperation control detector 41 for detecting whether or not each of the connectable nearby wireless access point executes cooperation control detected at the communication location of the terminal apparatus 2, a channel detector 42 for detecting a channel(s) to be used associated with each connectable nearby wireless access point, and a noise detector 43 for detecting a wireless noise level associated with each connectable nearby wireless access point. It should be noted that the terminal apparatus 2 is not limited to the configuration shown in FIG. 14, and may have a different configuration including at least part of the cooperation control detector 41, the channel detector 42, and the noise detector 43. Also, the function(s) of at least part of the cooperation control detector 41, the channel detector 42, and the noise detector 43 may be replaced with the communication quality measurer 13.

As shown in FIG. 15, before transmitting terminal information to the communication control apparatus 6, the terminal apparatus 2 detects the reliability of bandwidth estimation associated with each of the nearby access points (or the reliability of each nearby access point) to thereby generate reliability information including information on the detected reliabilities (S1020). The time at which S1020 starts may be changed as appropriate as long as the time is at least before the bandwidth estimation (S1005). The reliability information includes at least one type of information selected from information as to whether or not cooperation control is executed in each access point (hereinafter referred to as "cooperation control detection information"), information regarding overlaps of channels used in access points (the number of access points using the same channel, hereinafter referred to as "channel usage information"), information regarding wireless noise levels of access points (hereinafter referred to as "noise level information"), and information regarding RSSI associated with each access point.

The terminal apparatus 2 transmits the terminal information, which includes the communication location and the reliability information, to the communication control apparatus 6 (S1001). In this embodiment, when generating information on candidate wireless access points (S1002), the communication control apparatus 6 can use the reliability information received from the terminal apparatus 2 in order to extract candidate wireless access points for connection.

In S1002, the communication control apparatus 6 can use the cooperation control detection information, for example, in order to extract access points which execute cooperation control as candidate access points preferentially over access points which do not execute cooperation control. In some cases, the communication control apparatus 6 can use channel usage information, for example, in order to preferentially extract access points with less overlaps of channels as candidate access points. In some cases, the communication control apparatus 6 can use noise level information, for example, to preferentially extract access points with lower wireless noise level as candidate access points.

As a result, in S1003, the communication control apparatus 6 transmits to the terminal apparatus 2 the information on candidate wireless access points, which includes only candidates of access points extracted by taking the aforementioned reliability information into consideration (that is, candidates of access points with higher reliability).

Alternatively, the terminal apparatus 2 can receive notifications from a nearby access point, which notifies whether cooperation control is executed or not (e.g., a notification regarding the presence or absence of a quality information acquisition command (IEEE 802.11k), a channel roaming notification (IEEE 802.11r), or a notification regarding the presence or absence of a channel disconnection message), to thereby determine whether or not the access point executes cooperation control. In this case, the nearby access point may add information as to whether or not it executes cooperation control, to a beacon signal.

Further alternatively, the terminal apparatus 2 can acquire parameter change information from a nearby access point, which informs the terminal apparatus of whether or not each parameter used in cooperation control (such as channel, bandwidth, RTS threshold, transmission power, or ABF (Analogue Beam Forming)) has changed from its default value, to thereby determine whether or not the access point executes cooperation control.

In other embodiments, in S1020, the terminal apparatus 2 can use MAC address information of each access point, for example, to detect (estimate) whether or not cooperation control is executed. In this case, when detecting multiple access points having the same OUI (Organizationally Unique Identifier) among nearby access points (or access points within a prescribed area on the map), the terminal apparatus 2 can determine that those access points are ones where "cooperation control is executed." Alternatively, when the terminal apparatus 2 detects multiple access points having the same ESSID among nearby access points (or access points within a prescribed area on the map), the terminal apparatus 2 may determine that those access points are ones where "cooperation control is executed."

In other embodiments, the terminal apparatus 2 can determine the probability of whether or not cooperation control is executed based on the number of parameters used for cooperation control. (For example, when the number of such parameters is greater than a prescribed threshold, the terminal apparatus determines that "cooperation control is executed"). In some cases, the terminal apparatus 2 can determine the probability of whether or not cooperation control is executed based on the type of parameter used for cooperation control. For example, as shown in FIG. 16, using a prescribed cooperation control level for each type of parameter used for cooperation control, the reliability of an access point can be determined based on the cooperation control level. In one embodiment, the terminal apparatus 2 may determine that the reliability is low when the cooperation control level is 1, medium when the cooperation control level is 2, and high when the cooperation control level is 3.

Figure 17:
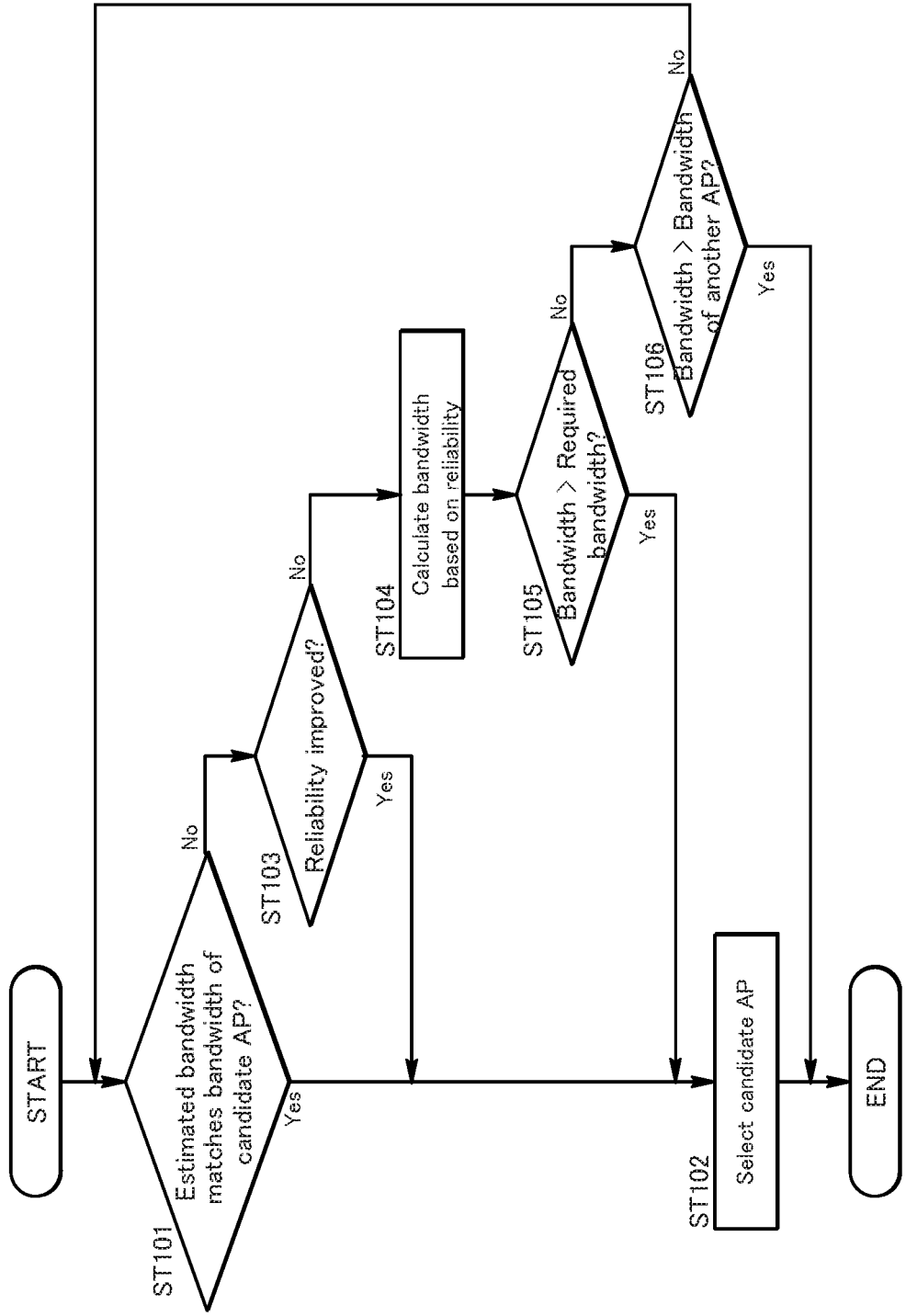
FIG. 17 is a flow chart illustrating details of the selection process of a wireless access point to be used for communication (S1006) shown in FIG. 15.

FIG. 17 is a flow chart illustrating details of the selection process of a wireless access point to be used for communication (S1006) shown in FIG. 15. In the selection process of a wireless access point to be used for communication (S1006), the terminal apparatus 2 first determines whether or not a bandwidth (estimated value) estimated in S1005 matches a bandwidth in the information on candidate wireless access points provided from the communication control apparatus 6. (In other words, the terminal apparatus determines whether the difference between them is within a prescribed threshold.) (ST101). When the bandwidth (estimated value) matches that in the information on candidate wireless access points (Yes), the terminal apparatus 2 selects the access point as a candidate wireless access point to be used for communication (ST102).

When the bandwidth (estimated value) does not match that in the information on candidate wireless access points (No), the terminal apparatus 2 compares the reliability detected (estimated) in S1020 with the reliability (past record) in the information on candidate wireless access points to determine whether or not the reliability is improved (i.e. whether the reliability detected in S1020 is higher or not) (ST103). When the reliability is improved (Yes), the terminal apparatus 2 selects the access point as a wireless access point to be used for communication (ST102).

When the reliability is not improved (No) in ST103, the terminal apparatus 2 calculates a bandwidth of the access point based on the reliability detected in S1020 (ST104) and determines whether or not the calculated bandwidth value meets the required bandwidth of an application executed in the terminal apparatus 2 (ST105). When the calculated bandwidth value meets the required bandwidth (Yes), the terminal apparatus 2 selects the access point as a wireless access point to be used for communication (ST102). In ST104, the bandwidth of an access point is calculated based on the reliability, for example, by multiplying a coefficient representing the degree of reduction in the reliability (the difference between the reliability from the information on candidate wireless access points and that detected in S1020) with a bandwidth estimated in S1005.

When the calculated bandwidth value doesn't meet the required bandwidth (No), the terminal apparatus 2 determines whether or not there is another access point (one which the terminal apparatus has not yet been determined whether or not to select as a wireless access point to be used for communication in S1006) having a bandwidth higher than the judged access point (ST106). When there is such another access point exists (No), the process returns to ST102 again to execute the same process as described above for another access point to be selected.

Finally, when the determinations whether or not to select as a wireless access point to be used for communication have been made to all access points and there is not any other access point having a bandwidth higher than the access point to be selected (ST106: Yes), none of the access points is selected as a wireless access point to be used for communication.

Although the present disclosure has been described with reference to specific embodiments, the embodiments are intended for purposes of illustration only, and are not intended to limit the scope of the present disclosure. Each of the elements of the terminal apparatus, the communication control apparatus, the communication system, and the communication control method as described above is not necessarily essential, and one or more of them can be eliminated or selected as appropriate without departing from the scope of the present disclosure. For example, a communication system of the present disclosure can be made by combining elements from different embodiments as appropriate into a further embodiment.

INDUSTRIAL APPLICABILITY

A terminal apparatus, a communication control apparatus, a communication system, and a communication control method according to the present disclosure enable proper selection of a wireless access point to be used for communication by taking into consideration accumulated past bandwidth information associated with each of the candidate wireless access points and a current bandwidth state of the access point, and are useful as a terminal apparatus which performs communication via a wireless access point, as a communication control apparatus which controls a connection from a terminal apparatus to a wireless access point, as a communication system including a terminal apparatus and a communication control apparatus, and as a communication control method for determining a wireless access point to be used for communication from a terminal apparatus.

GLOSSARY

1 communication system
2 terminal apparatus
3 base station
4 access point
5 communication network
6 communication control apparatus
10 location information acquirer
11 transmitter
12 receiver
13 communication quality measurer
14 bandwidth estimator
15 access point selector
20 receiver
21 transmitter
22 information acquirer
23 data storage
24 candidate information extractor
31 nearby AP detector
41 cooperation control detector
42 channel detector
43 noise detector

The invention claimed is:

1. A terminal apparatus configured to select a wireless access point to be used for communication from a plurality of connectable wireless access points by communicating with a communication control apparatus for communication control via a communication network, comprising:
   a processor for detecting one or more connectable nearby wireless access points at a communication location and for detecting whether or not each connectable nearby wireless access point executes cooperation control;
   a transmitter for transmitting terminal information to the communication control apparatus wherein the terminal information includes the following: information on the communication location where the terminal apparatus communicates with the communication control apparatus, information regarding the connectable nearby wireless access points, and information on one or more candidate wireless access points that correspond to the detection result for cooperation control;
   a receiver for receiving access point candidate information from the communication control apparatus wherein the access point candidate information includes information on candidate wireless access points for the communication location extracted by the detection result for cooperation control and for the connectable nearby wireless access points,
   wherein the processor estimates a current bandwidth associated with each of the candidate wireless access points included in the access point candidate information based on information on communication quality associated with each of the candidate wireless access points included in the access point candidate information, and selects at least one wireless access point to be used for communication from the candidate wireless access points included in the access point candidate information,
   wherein the access point candidate information includes past bandwidth information acquired associated with each of the candidate wireless access points,
   wherein the processor selects the at least one wireless access point based on the past bandwidth information and the estimated current bandwidth, and
   wherein the terminal apparatus is configured to connect to the communication network via a base station and the selected at least one wireless access point.

2. The terminal apparatus according to claim 1, wherein the information on communication quality includes an RTT (round-trip delay time).

3. The terminal apparatus according to claim 1, wherein the processor detects a channel to be used associated with each connectable nearby wireless access point,
   wherein the terminal information includes a detection result for channel to be used, and
   wherein the access point candidate information includes information on one or more candidate wireless access points that correspond to the detection result for channel to be used.

4. The terminal apparatus according to claim 1, wherein the processor detects a wireless noise level associated with each connectable nearby wireless access point,
   wherein the terminal information includes a detection result for wireless noise level, and
   wherein the access point candidate information includes information on one or more wireless access points that correspond to the detection result for wireless noise level.

5. The terminal apparatus according to claim 1, wherein the processor detects wireless signal intensities associated with the connectable wireless access points.

6. The terminal apparatus according to claim 1, wherein the transmitter transmits information on one or more detected nearby wireless access points and information on the estimated current bandwidth to the communication control apparatus.

7. A communication control apparatus configured to transmit the access point candidate information to the terminal apparatus according to claim 1.

8. A communication system comprising:
   the terminal apparatus according to claim 1; and
   the communication control apparatus according to claim 7.

9. A communication control method for a terminal apparatus, the terminal apparatus being configured to select a wireless access point to be used for communication from a plurality of connectable wireless access points by communicating with a communication control apparatus for communication control via a communication network, comprising:
   detecting one or more connectable nearby wireless access points at a communication location;
   detecting whether or not each connectable nearby wireless access point executes cooperation control;
   transmitting terminal information to the communication control apparatus wherein the terminal information includes the following: information on the communication location where the terminal apparatus communicates with the communication control apparatus via a communication network, information regarding the connectable nearby wireless access points, and information on one or more candidate wireless access points that correspond to the detection result for cooperation control;

receiving access point candidate information from the communication control apparatus wherein the access point candidate information includes information on candidate wireless access points for the communication location extracted by the detection result for cooperation control and for the connectable nearby wireless access points; and estimating a current bandwidth associated with each of the candidate wireless access points included in the access point candidate information based on information on communication quality associated with each of the candidate wireless access points included in the access point candidate information, wherein the access point candidate information includes past bandwidth information acquired associated with each of the candidate wireless access points;

wherein at least one wireless access point to be used for communication is selected from the candidate wireless access points included in the access point candidate information based on the past bandwidth information and the estimated current bandwidth associated with each of the candidate wireless access points, and wherein the terminal apparatus is configured to connect to the communication network via a base station and the selected at least one wireless access point.

* * * * *